(12) United States Patent
Hatoum

(10) Patent No.: US 12,090,919 B2
(45) Date of Patent: Sep. 17, 2024

(54) VEHICLE EXTENDED STOP ARM

(71) Applicant: CrossGuard LLC, Cocoa, FL (US)

(72) Inventor: Bassel Hatoum, Orlando, FL (US)

( * ) Notice: Subject to any disclaimer, the term of this patent is extended or adjusted under 35 U.S.C. 154(b) by 240 days.

(21) Appl. No.: 17/944,460

(22) Filed: Sep. 14, 2022

(65) Prior Publication Data
US 2023/0089438 A1  Mar. 23, 2023

Related U.S. Application Data

(60) Provisional application No. 63/247,177, filed on Sep. 22, 2021.

(51) Int. Cl.
| | |
|---|---|
| *B60R 19/48* | (2006.01) |
| *B60Q 1/26* | (2006.01) |
| *B60Q 1/48* | (2006.01) |
| *B60Q 11/00* | (2006.01) |
| *F16M 13/02* | (2006.01) |
| *G09F 7/22* | (2006.01) |
| *G09F 21/04* | (2006.01) |
| *F16D 7/00* | (2006.01) |

(52) U.S. Cl.
CPC ........... *B60Q 1/486* (2013.01); *B60Q 1/2657* (2013.01); *B60Q 1/2692* (2013.01); *F16M 13/022* (2013.01); *G09F 7/22* (2013.01); *G09F 21/048* (2013.01); *F16D 7/00* (2013.01); *F16M 2200/024* (2013.01); *F16M 2200/06* (2013.01)

(58) Field of Classification Search
CPC ........ B60Q 1/2692; B60Q 1/50; B60Q 1/503; B60Q 1/2615; B60Q 1/2657; B60Q 1/547; B60Q 1/2696; B60Q 1/2661; B60R 21/34; B60R 2021/0067; B60R 19/48; G09F 21/048; G09F 2007/1865
See application file for complete search history.

(56) References Cited

U.S. PATENT DOCUMENTS

| | | | | |
|---|---|---|---|---|
| 2,657,486 A | * | 11/1953 | Sweetser | G07F 17/145 194/902 |
| 4,360,796 A | * | 11/1982 | Shocknesse | G07G 3/003 340/928 |
| 4,531,325 A | * | 7/1985 | Phillips | E01F 13/06 49/49 |
| 4,697,541 A | * | 10/1987 | Wicker | B60Q 1/50 116/28 R |
| 4,956,630 A | * | 9/1990 | Wicker | B60Q 1/52 116/28 R |
| 5,357,239 A | * | 10/1994 | Lamparter | B60Q 1/50 318/281 |
| 6,213,047 B1 | * | 4/2001 | Means | B60Q 1/52 116/28 R |
| 6,213,526 B1 | * | 4/2001 | Swanger | B60R 19/48 116/28 R |

(Continued)

*Primary Examiner* — Shin H Kim
(74) *Attorney, Agent, or Firm* — Wolter VanDyke Davis, PLLC; Robert L. Wolter

(57) ABSTRACT

An apparatus (100), including: a framework (104) configured to be secured to a vehicle; an arm base (106) configured to pivot relative to the framework between a retracted position and an extended position; an arm (110) removably secured to and extending from the arm base; and a shock absorber (142) configured to absorb shock and to prevent relative movement between the arm base and the arm.

20 Claims, 9 Drawing Sheets

(56) References Cited

U.S. PATENT DOCUMENTS

| | | | |
|---|---|---|---|
| 6,234,105 B1 * | 5/2001 | Lamparter | B60R 21/34 |
| | | | 116/28 R |
| 6,396,395 B1 * | 5/2002 | Zielinski | B60Q 1/50 |
| | | | 340/471 |
| 6,477,978 B2 * | 11/2002 | Lamparter | B60R 21/34 |
| | | | 116/28 R |
| 6,540,275 B1 * | 4/2003 | Iwamoto | B60R 19/12 |
| | | | 293/121 |
| 9,245,465 B1 | 1/2016 | Geyer et al. | |
| 9,616,806 B2 * | 4/2017 | Buley | B60Q 1/2657 |
| 10,062,309 B1 | 8/2018 | Ringer | |
| 10,343,598 B2 | 7/2019 | Ringer | |
| 10,780,823 B2 | 9/2020 | Ringer | |
| 11,479,166 B2 * | 10/2022 | Ringer | H04N 7/188 |
| 11,875,712 B2 * | 1/2024 | Ringer | B60Q 1/547 |
| 2001/0004873 A1 * | 6/2001 | Lamparter | B60R 21/34 |
| | | | 116/28 R |
| 2003/0061982 A1 * | 4/2003 | Phillips | B60Q 1/503 |
| | | | 116/28 R |
| 2015/0158419 A1 * | 6/2015 | Buley | B60Q 1/2692 |
| | | | 362/478 |
| 2022/0041099 A1 | 2/2022 | Ringer | |
| 2023/0089438 A1 * | 3/2023 | Hatoum | B60Q 1/2657 |
| | | | 248/550 |
| 2023/0391251 A1 * | 12/2023 | Thompson | B60Q 1/2657 |

\* cited by examiner

VEHICLE EXTENDED STOP ARM

FIELD OF THE INVENTION

The invention relates to a vehicle extended stop arm such as that used by a school bus or traffic control vehicle.

BRIEF DESCRIPTION OF THE DRAWINGS

The invention is explained in the following description in view of the drawings that show.

DETAILED DESCRIPTION OF THE INVENTION

The present inventor has devised a unique an innovative vehicle extended stop assembly that minimizes the number of moving parts, that can absorb an impact by a vehicle without damage, and that can automatically resume operation after the impact.

In addition, when impacted by the vehicle, arms of certain vehicle extended stop assembly designs experience a whipping action where a tip of the arm whips into and damages the vehicle (e.g., the vehicle's windshield) during an impact between the arm and the vehicle. This can happen when the arm resists motion during the impact but is also flexible enough to bend during the impact. In the vehicle extended stop assembly disclosed herein, the arm is designed to have a relatively low moment of inertia, a relatively high stiffness, and a high toughness (impact resistance). The relatively low moment of inertia in conjunction with a slip drivetrain disposed between the arm, and, for example, a motor driving the arm, permit the arm to readily pivot out of the way in response to the vehicle impact. The relatively high stiffness keeps the arm from flexing enough to whip into the vehicle/windshield. The toughness ensures the arm survives the impact. This greatly reduces or eliminates any vehicle damage resulting from the vehicle impacting the arm while preserving the arm. In addition, prior art devices are known to use shear pins configured to break away upon impact by an errant vehicle. Such designs can create a safety hazard as the break-away design can create a projectile traveling at considerable speed. The device disclosed herein eliminates this safety hazard.

The vehicle extended stop assembly can be used alone or in conjunction with other vehicle extended stop assemblies on, for example, a school bus, law enforcement vehicles, and other traffic control vehicles, trailers, and devices.

Figure 1:
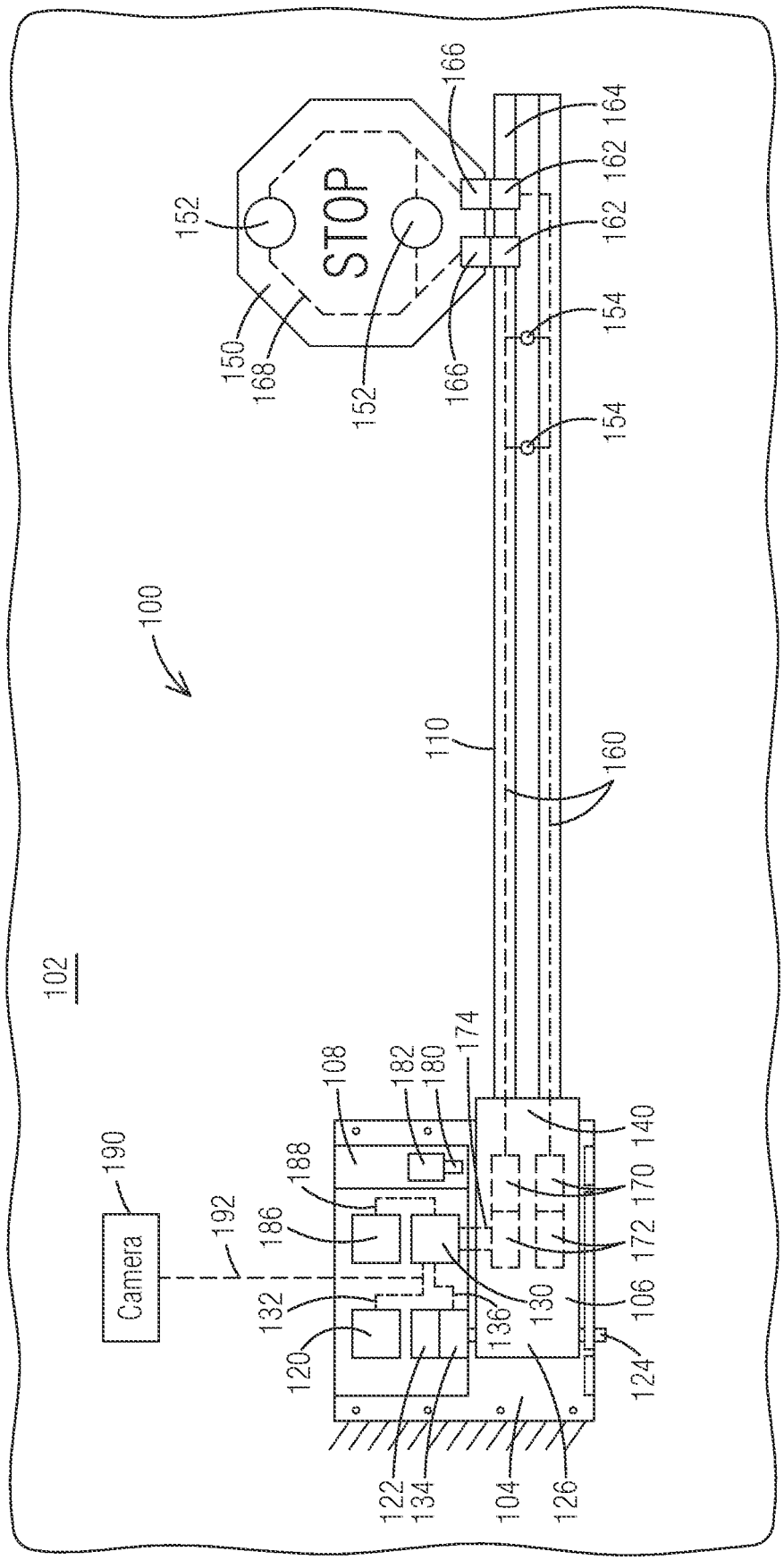
FIG. 1 is a side view of an example embodiment of a vehicle extended stop arm assembly disposed on a vehicle and having an example embodiment of an arm disposed in a retracted position.
Figure 2:
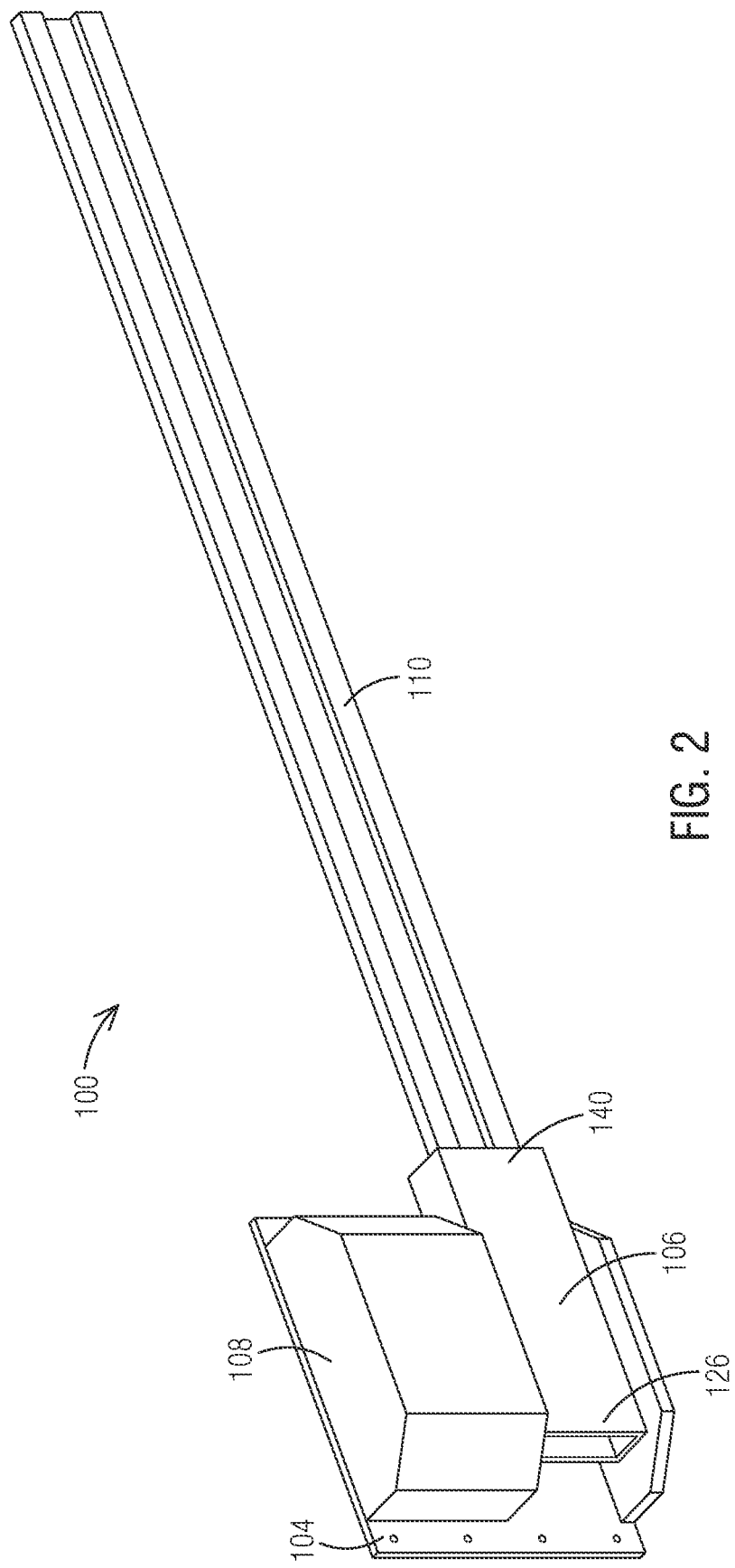
FIG. 2 to FIG. 3 are perspective views showing select parts of the vehicle extended stop arm assembly of FIG. 1 with the arm in the retracted position.
Figure 3:
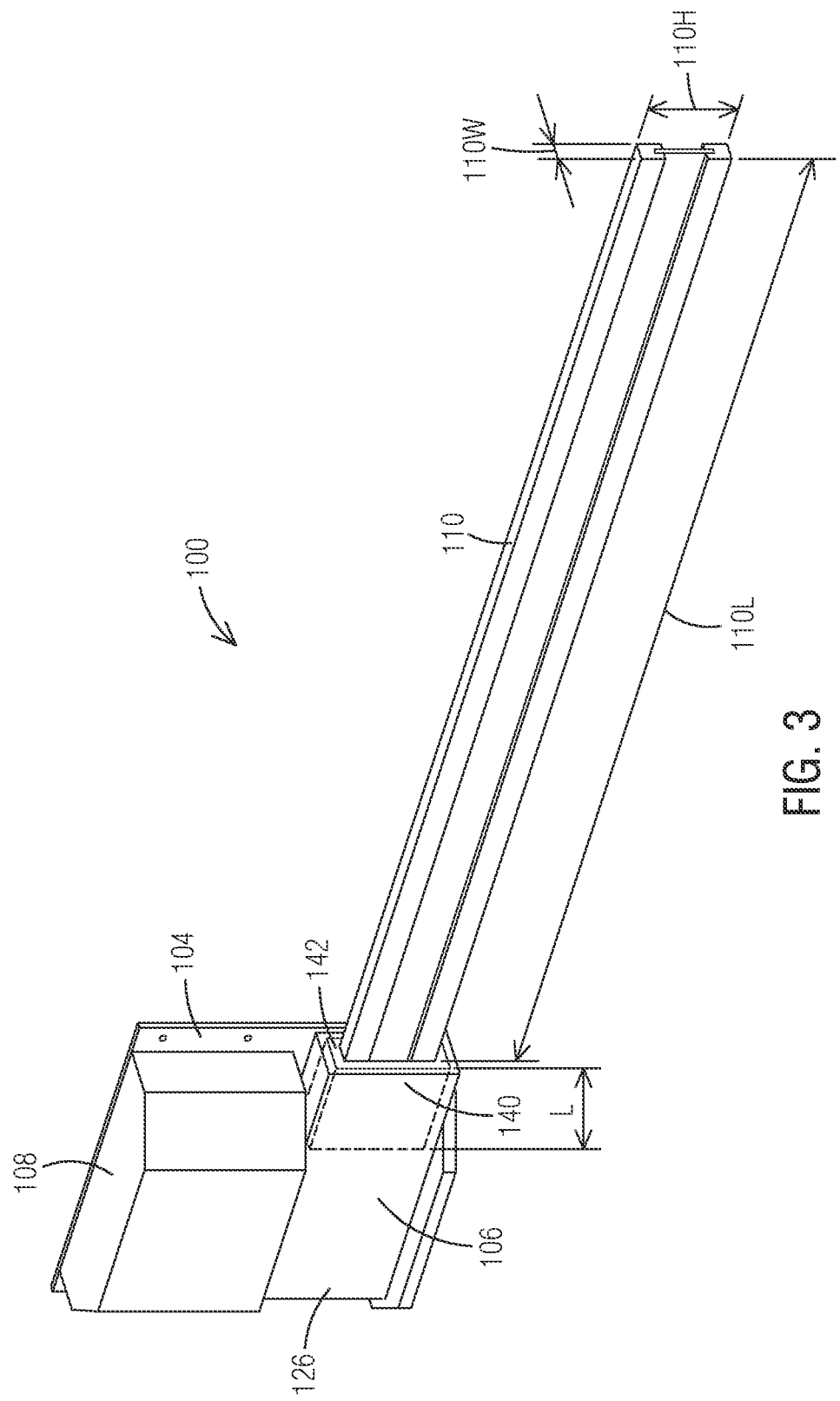
Figure 4:
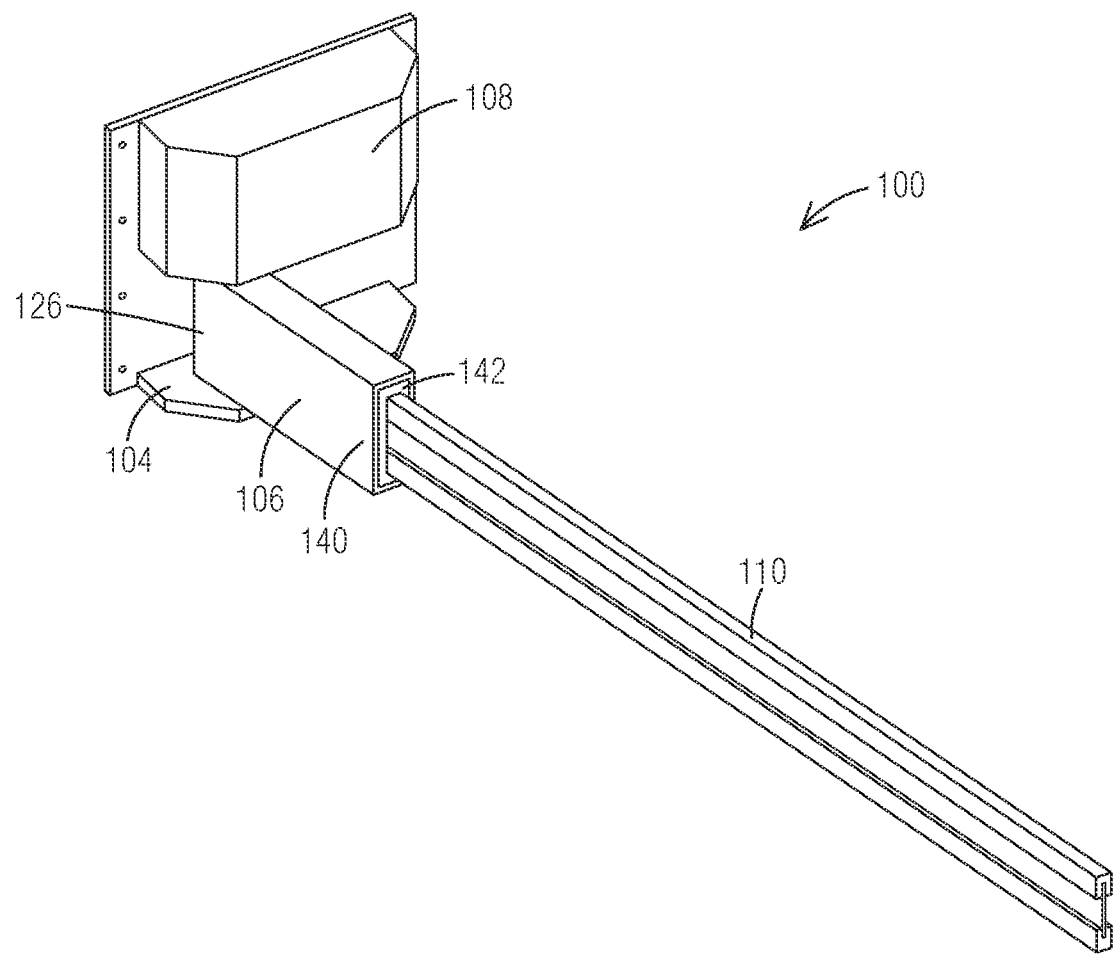
FIG. 4 is a perspective view showing select parts of the vehicle extended stop arm assembly of FIG. 1 with the arm in an extended position.

FIG. 1 is a schematic side view of an example embodiment of a vehicle extended stop arm assembly 100 disposed on a vehicle 102 and with the arm in a retracted position. FIG. 2 to FIG. 3 are different perspective views showing select parts of the vehicle extended stop arm assembly 100 with the arm in the retracted position. FIG. 4 is a perspective view showing select parts of the vehicle extended stop arm assembly 100 with the arm in an extended position.

The vehicle extended stop arm assembly 100 includes a framework 104 configured to be secured to a vehicle 102, an arm base 106 configured to pivot relative to the framework 104 between a retracted position (FIG. 1) and an extended position (FIG. 4), a cover 108, and an arm 110 removably secured to and extending from the arm base 106. A force producer 120 is secured to the framework 104 and generates a force that is used to move the arm base 106 and associated arm 110. The force producer 120 can generate linear force or rotary force (e.g., torque) and can be any suitable device known to the artisan. For example, the force producer 120 can be an electric motor (e.g., A/C, D/C, servo, stepper), a pneumatic motor (rotary vane or similar), or a pneumatic or hydraulic cylinder etc. The force can be transferred from the force producer 120 to the arm base 106 directly, or via a drivetrain 122 having one or more drive components, such as a linear actuator, levers, gears, shafts, clutches, and the like.

In an example embodiment, the force producer 120 is an electric motor and the drivetrain 122 includes a slip drivetrain. The slip drivetrain can be any type of drivetrain that permits slipping, including, for example, a slip clutch. In this example embodiment, a slip clutch is connected to an arm base shaft 124 (of e.g., stainless steel) that is secured to a first end 126 of the arm base 106. The motor rotates the slip clutch. This, in turn, rotates the arm base shaft 124, the arm base 106, and the associated arm 110 therewith between the retracted position and the extended position. A controller 130, optionally secured to the framework 104, is in at least one of electrical communication and data communication 132 with the force producer 120 (e.g., the electric motor) and is configured to control the force producer 120 and thereby control a position of the arm base 106 and associated arm 110.

An optional encoder 134, (e.g., multi-pole magnet with Hall sensors, or a rotary optical encoder with light emitter and detector), is secured to the arm base shaft 124 and is in data communication 136 with the controller 130. In a manner known to the artisan, the encoder 134 registers an actual position of the arm base shaft 124, which indicates an associated actual position of the arm base 106 and the associated arm 110, relative to the force producer 120. In the example embodiment shown, if the arm base shaft 124 slips/rotates relative to/within the slip clutch, (e.g., via a vehicle impact), and hence relative to the motor, the controller 130 will recognize this because the encoder 134 will indicate the actual movement resulting from the impact. The controller 130 can automatically recalibrate the actual position of the arm base shaft 124 relative to the motor 120 and can then return the arm 110 to a desired position (e.g., the retracted position or the extended position) and resume normal operation without outside intervention.

In the example embodiment shown, the arm 110 is configured to slide into a second end 140 of the arm base 106, though the reverse is equally possible.

A shock absorber 142 (e.g., of a resilient material like rubber) is optionally disposed between the arm base 106 and the arm 110 to absorb shock therebetween. The shock absorber 142 protects the drivetrain 122 and the force producer 120 during an impact at least by reducing the probability of breaking drivetrain components (e.g., gear teeth) before the impact forces overcome the static friction of the slip drivetrain (e.g., the slip clutch). In an example embodiment, the arm 110 fits into the shock absorber 142 and the arm 110 and the shock absorber 142 fit into the arm base 106. The shock absorber may be separable from the arm 110 or may be molded directly onto the arm and therefore not readily separable from the arm 110.

As can be seen in the example embodiment of FIG. 3, the shock absorber 142 has a length L which provides continuous contact between the arm base 106 and the arm 110 over a length of the arm 110. This prevents relative movement between the arm base 106 and the arm 110. In an alternate example embodiment, the shock absorber 142 may be two or more bands that are spaced apart and that absorb shock and prevent relative movement between the arm base 106 and the arm 110. Various other suitable embodiments known to the artisan can also be used.

In an example embodiment, the arm 110 is installed in the arm base 106 by simply sliding the arm 110 into the arm base 106. Optionally, the arm 110 may then be secured to the arm base 106 via fasteners or the like. Such an arrangement allows for easy replacement of the arm 110.

The arm 110 is configured to support a stop sign 150 so that the stop sign 150 moves with the arm 110 between the retracted position and the extended position. The stop sign 150 can be any suitable stop sign known to the artisan and optionally includes one or more stop sign lights 152 (e.g., red lights, such as LED lights) disposed thereon. Alternately, or in addition, the arm 110 includes one or more arm lights 154. The arm lights 154 can be any suitable type, including LED lights. The arm lights 154 may emit one or more colors. When multiple arm lights 154 are used, each may display any color for any duration or pattern independently or in conjunction with the other arm lights 154.

In an embodiment, the arm 110 includes an arm electrical circuit 160 including exposed arm electrical load contacts 162 disposed on an exterior surface 164 of the arm 110. The exposed arm electrical load contacts 162 may be configured to match up with stop sign contacts 166 which, in turn, power the stop sign lights 152 via a stop sign electrical circuit 168. The exposed arm electrical load contacts 162 may be composed of weather resistant material such as stainless steel or the like. The arm lights 154 may be electrically connected to the arm electrical circuit 160 or they may be separately powered and controlled.

The arm electrical circuit 160 may further include exposed arm electrical supply contacts 170 and the arm base 106 may include arm base load contacts 172 configured to automatically contact the exposed arm electrical supply contacts 170 as the arm 110 and the arm base 106 are assembled together, and thereby convey electricity to the arm electrical circuit 160. Alternately, the arm base load contacts 172 and the exposed arm electrical supply contacts 170 may be in the form of a conventional harness arrangement. The arm base load contacts 172 are optionally in electrical and/or data communication 174 with the controller 130. Hence, the controller 130 can control the arm electrical circuit 160 and lights and other electronic components connected thereto.

The arm 110 is characterized by an arm length 110L which may vary, depending on the application. For example, different localities may require different arm lengths 110L based on road or traffic conditions. Likewise, the arm length 110L may vary depending on what type of vehicle 102 or device the arm 110 is mounted to. In the example embodiment of FIG. 3, the arm length 110L is forty-seven (47) inches, the arm width 110W is 0.75 inches, and the arm height 110H is 3.5 inches. In other embodiments, the arm length 110L of the arm 110 may be from (1) foot to twelve (12) feet, the arm width 110W may be from 0.25 inches to four (4) inches, and the arm height 110H may be from one (1) to twelve (12) inches.

The vehicle extended stop arm assembly 100 optionally includes a lock mechanism configured to lock the arm 110 in the retracted position. In an example embodiment, the lock mechanism includes a pin 180 (e.g., based on a door latch bolt) configured to extend into the arm base 106 and thereby lock the arm base 106 in the retracted position; and a spring 180S (see FIG. 12) configured to spring load the pin 180 into an extended position. The pin 180 can be at least one of manually retracted and selectively automatically retracted (e.g., via the controller 130) to release the arm base 106 and thereby free the arm base 106 to be extended. This configuration allows an operator to manually push the arm 110 into the retracted position in the event of an electrical or mechanical failure. Such movement into the retracted position is similar to the way a door is shut by pressing it closed. As such, if the arm 110 is stuck in the extended position, an operator can simply push the arm 110 back toward the vehicle 102 until the spring-loaded pin 180 secures the arm 110 in the retracted position, all without requiring power. The pin 180 may be selectively retracted by, for example, a solenoid 182 controlled the controller 130 or other suitable mechanism known to the artisan.

The vehicle extended stop arm assembly 100 optionally includes one or more cameras 190. The one or more cameras 190 may optionally be in data communication 192 with the controller 130 and thereby controlled by the controller 130. Video and/or still image recording may be continuous or may occur during select times, such as when the arm 110 is in the extended position and limited time periods before and/or after.

Likewise, the vehicle extended stop arm assembly 100 optionally includes a GPS 186. The GPS 186 may optionally be in data communication 188 with the controller 130 and thereby controlled by the controller 130. Data collection regarding the location and velocity of the vehicle 102 may be continuous or may occur during select times, such as when the arm 110 is in the extended position and limited time periods before and/or after.

Figure 5:
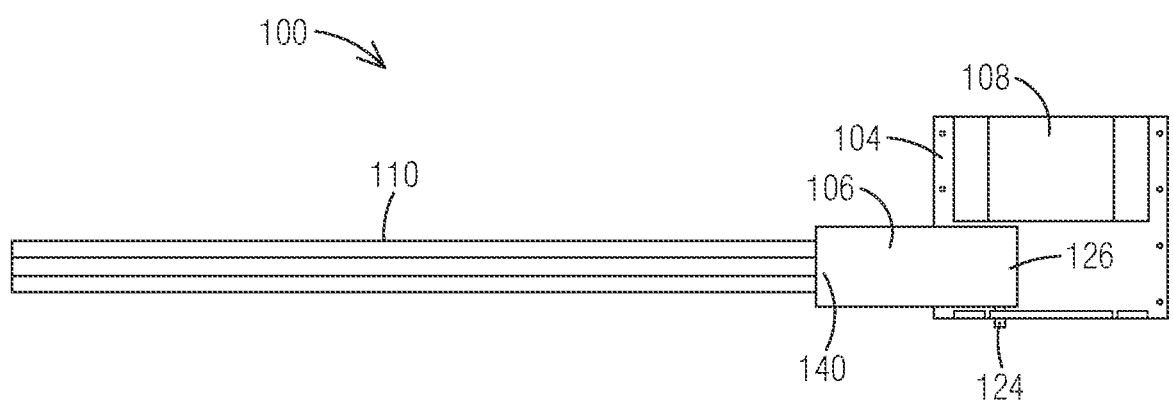
FIG. 5 is a side view showing select parts of the vehicle extended stop arm assembly of FIG. 1 with the arm disposed past the extended position.

As can be seen in FIG. 5, the framework 104 and the arm base 106 are structurally configured to permit the arm base 106 and the arm 110 to pivot past the extended position (FIG. 4). This is possible even when the force producer 120 (e.g., the electric motor) controlling the arm base 106 remains in a fixed position because the slip clutch permits the relative movement therebetween when sufficient external force is applied to the arm 110 and arm base 106. This can happen, for example, when the arm 110 is subjected to an external force such as a vehicle impact. In an example embodiment, the framework 104 and the arm base 106 are structurally configured to permit the arm base 106 to pivot as much as 180 degrees from the retracted position, as is shown in FIG. 5.

Such a configuration may be suited for use on a vehicle such as a bus or a law enforcement vehicle and the like. In the retracted position (FIG. 1), the arm 110 is essentially parallel to a side of the bus. In the extended position (FIG. 4), the arm 110 is essentially perpendicular to the side of the bus and thereby extending laterally across the roadway. If a vehicle traveling from right to left (e.g., overtaking the bus) impacts the arm 110, the vehicle can push the arm 110 and the arm 110 can move to the position shown in FIG. 5 where it is again parallel to the side of the bus, but pointing the opposite direction compared to the retracted position (FIG. 1). However, alternative embodiments may permit a greater or lesser degree of rotation from the retracted position, depending on requirements. This would be made possible by simply changing a shape of the framework 104 behind the arm base 106 to permit the necessary travel.

In an instance where a vehicle is traveling from left to right in FIG. 5, the arm 110 can likewise be pushed from the extended position (FIG. 4) as far as to the retracted position (FIG. 1). Further, it is possible that some installations may require the arm 110 to be able to swing past the retracted position in this scenario, which would again be possible by simply changing a shape of the framework 104 behind the arm base 106 to permit the necessary travel.

Figure 6:
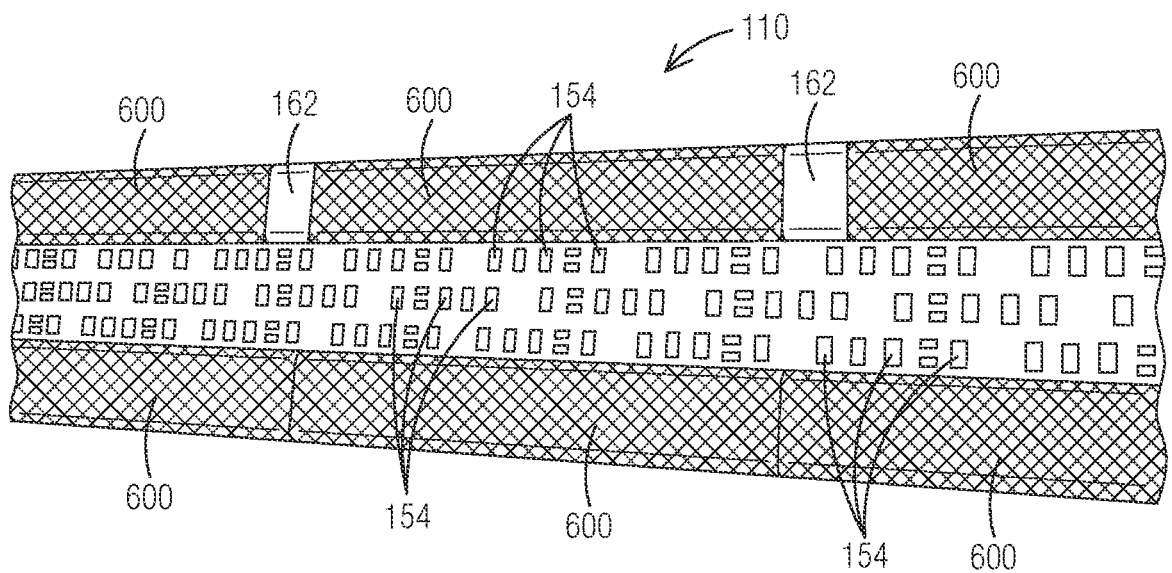
FIG. 6 shows the arm of FIG. 1 with an example embodiment of exposed arm electrical load contacts and an example embodiment of lights disposed thereon.

FIG. 6 shows the arm 110 of FIG. 1 with an example embodiment of the exposed arm electrical load contacts 162 and an example embodiment of lights disposed thereon. Wiring for the arm electrical circuit 160 (not visible in FIG. 6) that leads to and from the exposed arm electrical load contacts 162 is concealed within the body of the arm 110. Such an arrangement provides for extremely simple installation of the stop sign 150 and establishment of electrical communication between the arm 110 and the stop sign 150.

The arm 110 may also include reflective material 600 in one or more colors (e.g., red, white) and in any pattern (e.g., alternating). In addition, the arm 110 optionally includes the arm lights 154. The arm lights 154 can be any suitable type, such as LED lights. There may be any variety of colors and they may be arranged in any pattern and controlled via the controller 130 to illuminate in any suitable way. For example, the arm light(s) 154 may be activated whenever the arm 110 is outside of the retracted position. Similarly, the stop sign light(s) 152 may be activated whenever the arm 110 is outside of the retracted position.

Figure 7:
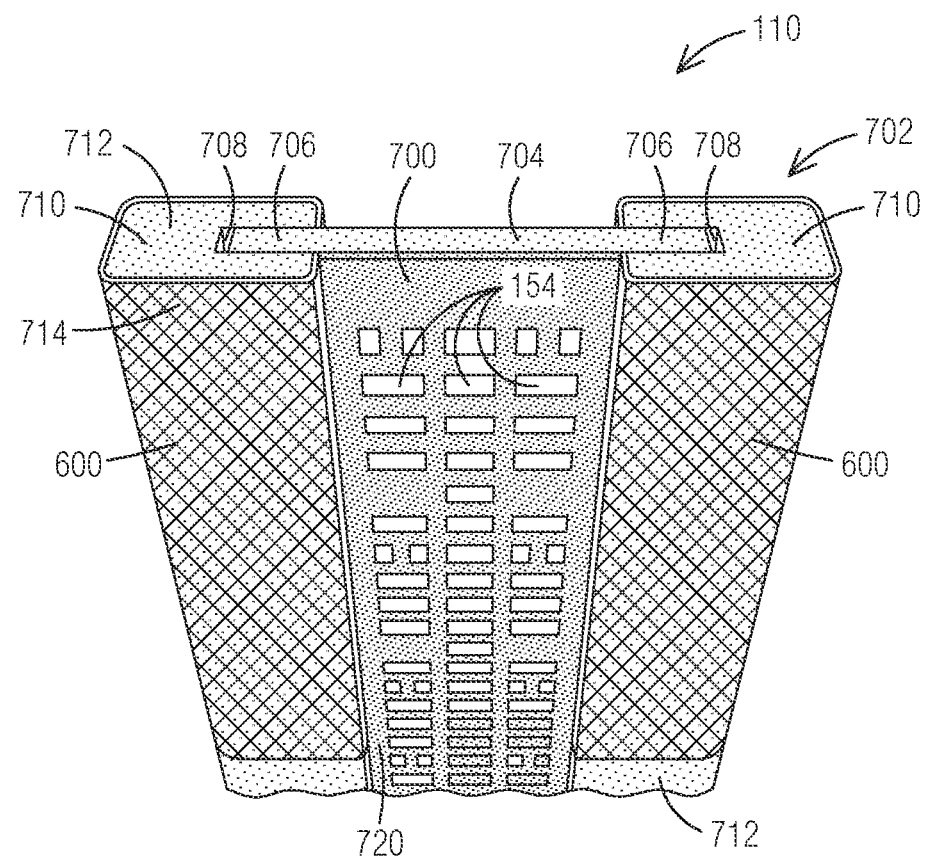
FIG. 7 shows an example embodiment of a structure of the arm of FIG. 1.
Figure 8:
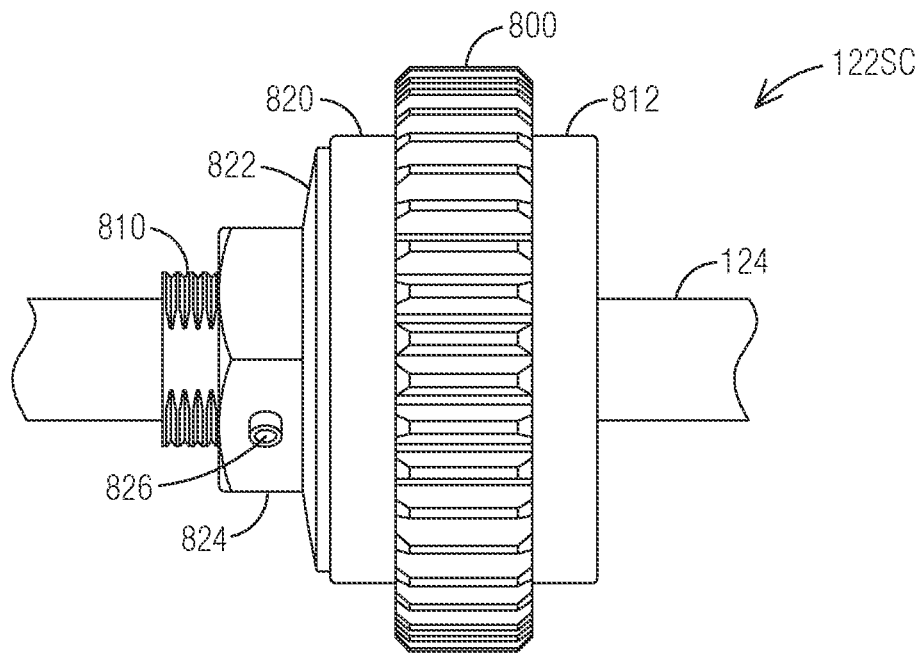
FIG. 8 to FIG. 11 show an example embodiment of a slip clutch and parts thereof of the vehicle extended stop arm assembly of FIG. 1.
Figure 9:
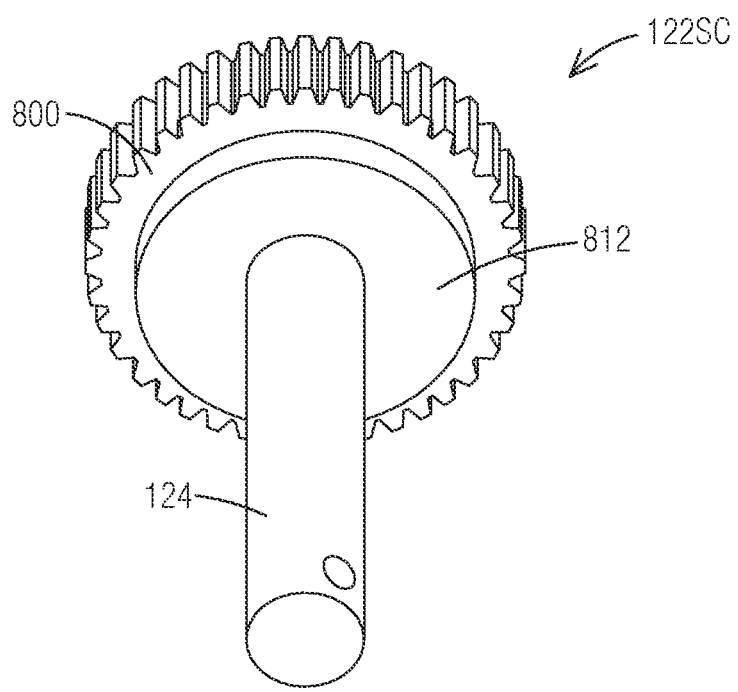
Figure 10:
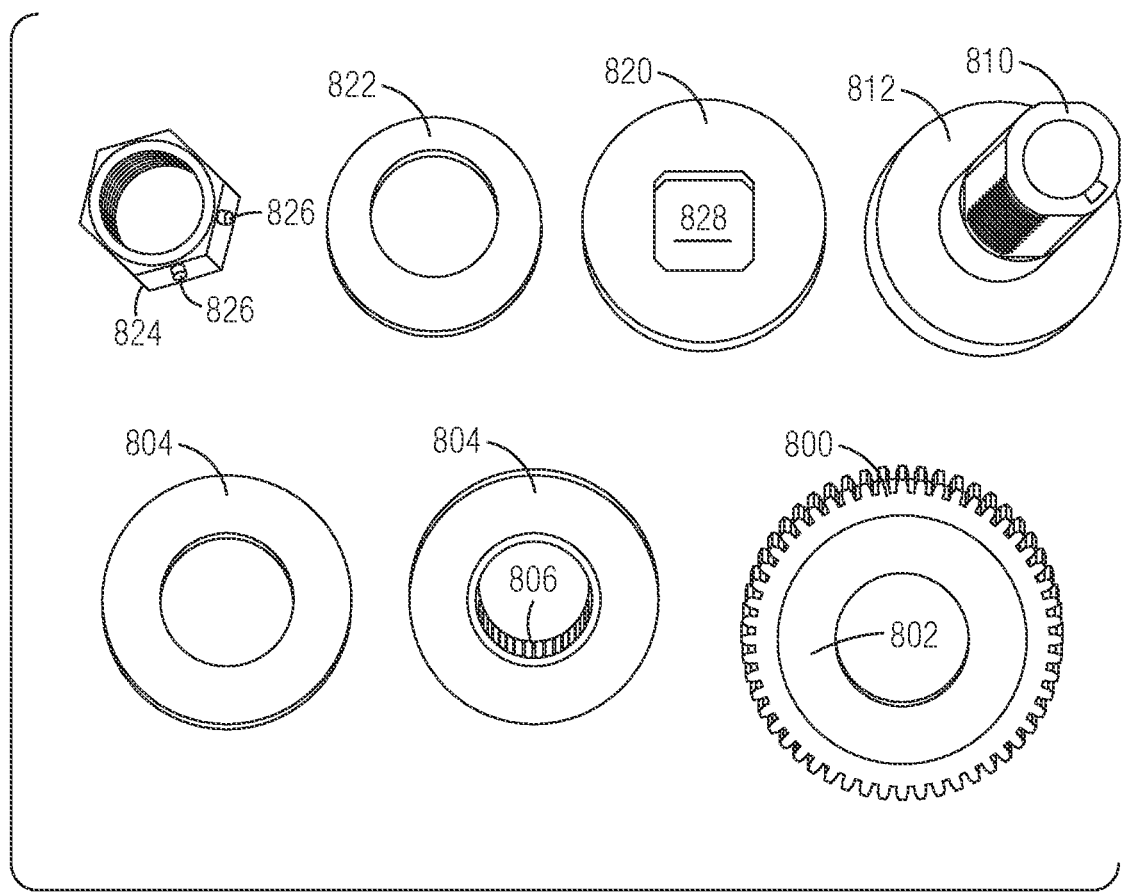
Figure 11:
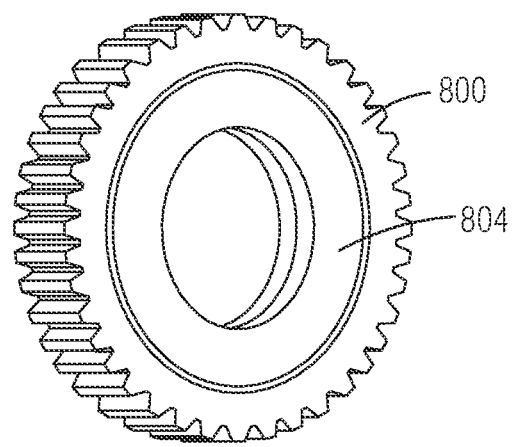

As can be seen in FIG. 7, the arm lights 154 may encapsulated by an arm light coating 700 (e.g., transparent rubber) that protects the arm lights 154 from the weather, debris and the like.

Also visible in FIG. 7 is an example embodiment of a structure 702 of the arm 110. The structure shown resembles an engineered I-beam having a web 704 with edges 706 installed in grooves 708 of respective flanges 710. The structure 702 may be held together via fasteners, or via an adhesive between the edges 706 and the grooves 708 and/or by a structure coating 712 that at least partly encapsulates the structure 702. In an example embodiment, adhesive and/or the structure coating 712 can be a polyurethane epoxy. In addition to holding or helping to hold the structure together, the structure coating 712 can also protect the structure 702 from the weather debris, and the like. The structure coating 712 can encapsulate the arm light coating 700 as well as the structure 702, or the arm light coating can be a part of the structure coating 712.

The web 704 and/or the flanges 710 may be composed of a body material characterized by a relatively low density and a relatively high stiffness. The low density reduces inertia and thereby helps reduce resistance to displacement during, for example, a vehicle impact. The high stiffness helps reduce bending that occurs during an impact and an associated whipping action that may damage the impacting vehicle. Moreover, the simple arm design disclosed herein minimizes mass at a distal end 714 of the arm 110, further reducing any whipping action.

Example suitable body materials include composite materials where fibers are bound by a resin or a plastic or the like. The fibers can include one or any combination of glass fibers, carbon fibers, aramid fibers to achieve the required strength, stiffness, and impact resistance (a.k.a. toughness). For example a combination of glass and aramid may be used to take advantage of the strength properties of glass fibers along with the impact resistance of aramid fibers. In an example embodiment, the fibers are pultruded fibers. In the example embodiment shown, the flanges 710 include pultruded fiberglass and the web 704 includes structural fiberglass sheet stock that has been machined to size. Alternately, the flanges 710 and the web 704 could be pultruded as a single piece so that machining and bonding are not necessary. In other example embodiments, various types of fibers could be mixed or layered to improve the properties of the finished structure.

In an example embodiment in which the arm length 110L is forty-seven (47) inches, the whipping action can be significantly reduced or eliminated when, for example, the arm 110 is characterized by a stiffness coefficient (k) of 300 pounds (+/−ten percent (10%)) per inch of deflection when the arm 110 is supported at both ends and force is applied to a center of a face side 720 of the arm 110. Such a force simulates a perpendicular impact of a vehicle with an arm 110 that is extended.

In an example embodiment, the Young's modulus (modulus of elasticity) of the arm 110 based on the selected material (e.g., pultruded fiberglass for the flanges 710, and structural fiberglass for the web 704) and the type of construction (e.g., flanges 710 slotted and bonded to the web 704 with polyurethane adhesive to resemble an I-beam as shown in FIG. 7) is 3,750,000 psi, +/−ten percent (10%).

The arm base 106 also pivots with the arm 110 and thereby contributes to any resistance to displacement during an impact. However, the arm base 106 is relatively smaller than and much closer to the pivot at the arm base shaft 124 than is the arm 110. Hence, its contribution to the total resistance to displacement during an impact is significantly less compared to that of the arm 110. As a result, materials such as stainless steels have been found to be suitable. Other acceptable materials include aluminum and/or composites. However, should an even further reduction is resistance to displacement during an impact is sought, the arm base 106 can readily be made from other materials, including materials including pultruded fibers such as pultruded fiberglass.

FIG. 8 to FIG. 11 show an example embodiment of a slip clutch 122SC of the drivetrain 122 and parts thereof of the vehicle extended stop arm assembly 100. In this example embodiment, the motor drives a gear 800 having two gear friction surfaces 802 (only one friction surface 802 is visible) that are compressed between two friction pads 804. The gear 800 is disposed concentrically on the bearing 806 and the gear 800, the bearing 806, and the two friction pads 804 are disposed concentrically on a shank 810 which is, in turn, secured to a first pressure plate 812. A second pressure plate 820 is positioned on the shank 810 and along with a spring washer 822 and a nut 824. The spring washer 822 presses on the second pressure plate 820 to cause the first pressure plate 812 and the second pressure plate 820 press on the respective friction pads 804. The amount of force exerted by the spring washer 822 is determined by adjusting the nut 824. A position of the nut 824 can be set via one or more set screws 826. The arm base shaft 124 passes through and is keyed to the shank 810. An opening 828 in the second pressure plate 820 is keyed to the shank 810.

Since the arm base shaft 124 is keyed to the shank 810, the shank 810 is rigidly fixed relative to the first pressure plate 812, the second pressure plate 820 is keyed to the shank 810, and the spring washer 822 and the nut 824 move with the shank 810, all these components move together. The gear 800 and its two gear friction surfaces 802 are only frictionally sandwiched between the two friction pads 804 which are, in turn, only frictionally sandwiched between the first pressure plate 812 and the second pressure plate 820. Hence, when there is sufficient friction among the sandwiched parts to overcome any forces acting on the arm base 106 and the arm 110, the arm base shaft 124 moves with the gear 800. However, when there is less friction among the sandwiched parts to overcome forces acting on the arm base 106 and the arm 110, (e.g., via a vehicle impact with the arm 110), the gear friction surfaces 802 and/or one or both of the two friction pads 804 will slip, thereby allowing the arm base shaft 124 to move in a manner that does not directly correspond with movement of the gear 800. For example, the arm base shaft 124 may move at a different speed than the gear 800, the arm base shaft 124 may move when the gear 800 does not move, and the arm base shaft 124 may not move when the gear 800 moves.

The amount of friction and associated slip characteristics can be adjusted by adjusting the nut 824, which adjusts the amount of compressive force exerted by the spring washer 822 on the two friction pads 804. Alternately, or in addition, a material of the friction pads 804 can be selected in accord with friction requirements. Various other changes known to the artisan can also be made, such as changing the dimensions (e.g., diameter) of the gear friction surfaces 802 and of the friction pads 804 etc. Moreover, other types of slip clutches known to the artisan can be used.

Figure 12:
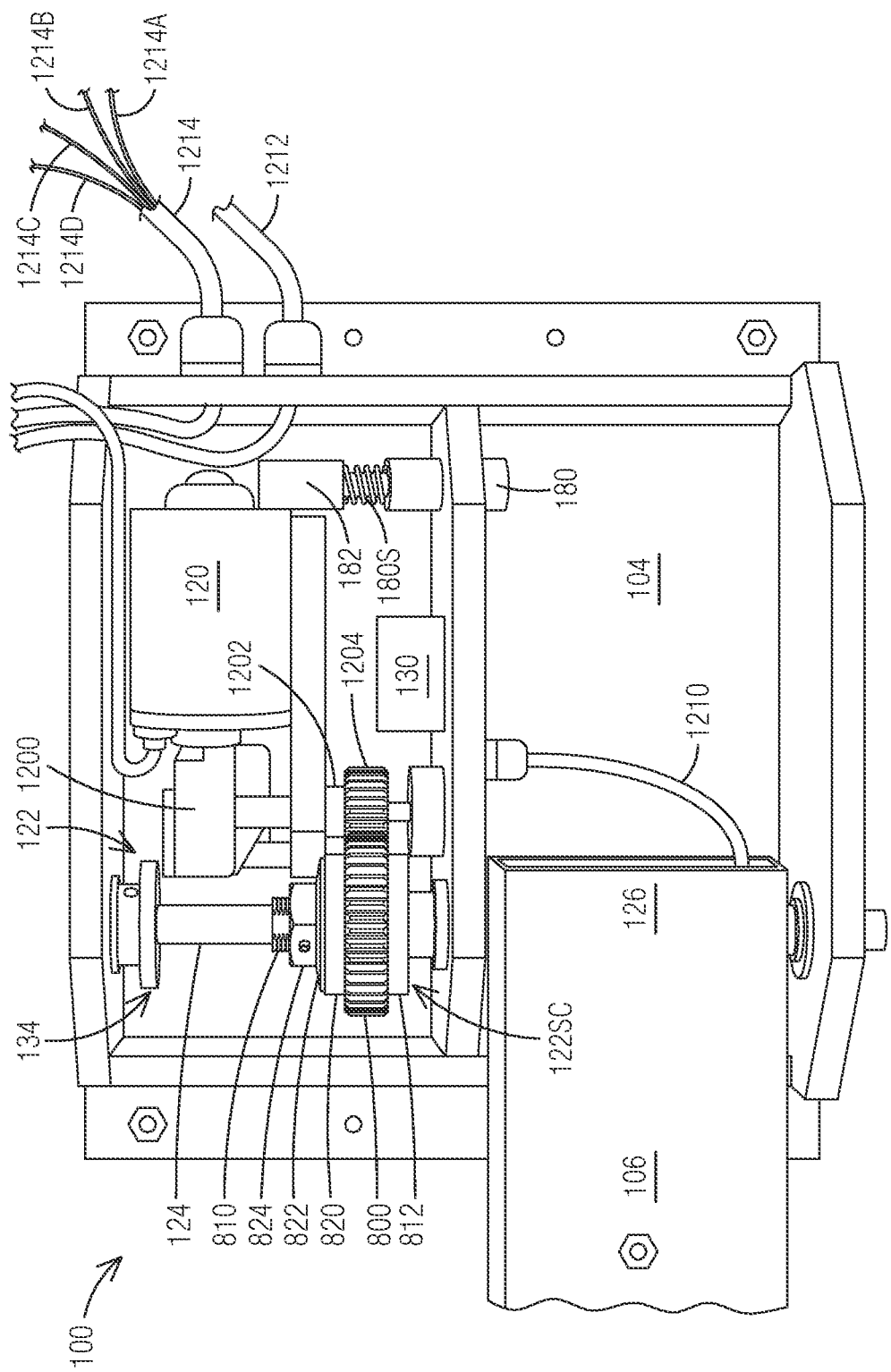
FIG. 12 shows an example embodiment of the vehicle extended stop arm assembly with the cover removed.

FIG. 12 shows an example embodiment of the vehicle extended stop arm assembly 100 with the cover removed. Visible are the force producer 120 (e.g., a motor), the drivetrain 122, the controller 130, the encoder 134, the pin 180, the spring 180S, and the solenoid 182. The drivetrain 122 includes a right-angle gearbox 1200, a first shaft 1202, and a driving gear 1204 that drives the gear 800 of the slip clutch 122SC. In this example embodiment, the slip clutch 122SC is of a similar configuration as shown in FIG. 8-11. An arm line 1210 at least provides electrical power for the arm electrical circuit 160. The controller 130 may optionally include wireless technology to allow arm 110 operation, firmware updates, download of logs, download of video capture, or any combination thereof.

A stop sign power line 1212 feeds electrical power to a remote stop sign with LED lights (not shown in FIG. 12).

A multi-line 1214 includes a power supply line 1214A for the vehicle extended stop arm assembly 100, a control signal line 1214B to carry a signal to trigger the movement of the arm 110, a diagnostic output line 1214C configured to drive an LED on a bus control panel (not shown in FIG. 12) to indicate the status of the vehicle extended stop arm assembly 100, and a data signal line 1214D that can be used to update device firmware and download operational logs (e.g., the controller 130 may be configured to log up to every use of the vehicle extended stop arm assembly 100 along with GPS coordinates and/or a date and/or time of use).

Figure 13:
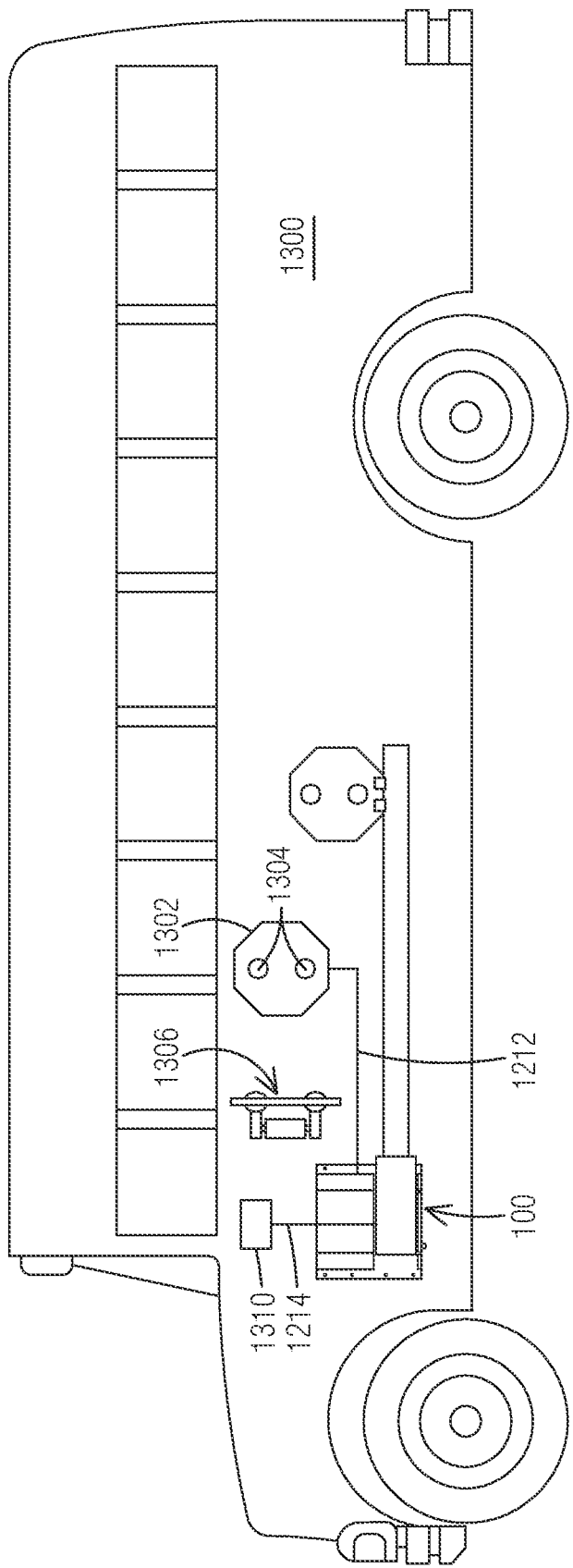
FIG. 13 shows the vehicle extended stop arm assembly installed on a school bus.

FIG. 13 shows the vehicle extended stop arm assembly 100 installed on a school bus 1300. Also shown is the remote stop sign 1302 with LED lights 1304. The remote stop sign 1302 is secured to the side of the school bus 1300 and faces vehicles approaching the school bus 1300 from the driver's left side. The remote stop sign 1300 provides signaling parallel to the side of the school bus 1300 that is in addition to the perpendicular signaling provided by the vehicle extended stop arm assembly 100 and optionally a conventional hinged stop sign 1306. Having parallel and perpendicular signaling increases the overall visibility for drivers coming from in front of, behind, and to the side of the school bus 1300.

Also shown is a driver control station 1310 at least in data communication with the vehicle extended stop arm assembly 100 via the multi-line 1214. The driver control station 1310 is configured to enable the driver to interface with the vehicle extended stop arm assembly 100 to perform such tasks as, for example, triggering movement of the arm 110, determining the status of the vehicle extended stop arm assembly 100, updating device firmware, and downloading the operational logs etc. The driver control station 1310 may optionally include wireless technology to allow for data communication with the controller 130 to allow the arm 110 operation, the firmware updates, the download of logs, the download of video capture, or any combination thereof.

From the above it can be seen that the inventor has created a vehicle extended stop arm assembly 100 that is simple in design, durable enough to withstand vehicle impacts with little to no damage to itself or the impacting vehicle, that can automatically self-correct if the arm is forced out of position and thereby resume normal operation without any external intervention, that can be serviced easily, and that can withstand the elements. Hence, it represents an improvement in the art.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus, comprising:
   a framework configured to be secured to a vehicle;
   an arm base secured to and configured to pivot relative to the framework between a retracted position and an extended position;
   an arm removably secured to and extending from the arm base; and
   a shock absorber configured to absorb shock and to prevent relative movement between the arm base and the arm.

2. The apparatus of claim 1, wherein the arm is disposed within the shock absorber and the shock absorber and the arm slide into the arm base.

3. The apparatus of claim 1, further comprising an electric motor secured to the framework and configured to pivot the arm base relative to the framework.

4. The apparatus of claim 3, further comprising a slip clutch configured to connect the electric motor to the arm base.

5. The apparatus of claim 4, wherein the framework and the arm base are structurally configured to permit the arm base and the arm to pivot past the extended position when the arm is subjected to an external force; and
   wherein the slip clutch is configured to slip to permit the arm base and the arm to pivot past the extended position when the arm is subjected to the external force.

6. The apparatus of claim 4, further comprising:
   a position encoder configured to register a rotational position of the arm base relative to the framework; and
   a controller configured to control the electric motor; to monitor the rotational position of the arm base; and to recognize when the slip clutch has slipped.

7. The apparatus of claim 6, wherein the controller is further configured to return the arm base to a desired rotational position after the controller recognizes that the slip clutch has slipped.

8. The apparatus of claim 1, further comprising an arm electrical circuit comprising exposed arm electrical load contacts disposed on an exterior surface of the arm.

9. The apparatus of claim 8, wherein the arm electrical circuit comprises exposed arm electrical supply contacts, and
   wherein the arm base comprises arm base load contacts configured to contact the exposed arm electrical supply contacts as the arm and the arm base are assembled together.

10. The apparatus of claim 9, wherein the arm is configured to be inserted into the arm base, and wherein when the arm is inserted into the arm base the exposed arm electrical supply contacts contact the arm base load contacts.

11. The apparatus of claim 1, wherein the arm comprises at least one arm light disposed thereon.

12. The apparatus of claim 1, further comprising a locking pin configured to lock the arm base in the retracted position and to release the arm base to enable the arm base to pivot to the extended position.

13. The apparatus of claim 1, further comprising the vehicle, wherein the vehicle comprises a school bus.

14. An apparatus, comprising:
   a framework configured to be secured to a vehicle;
   an arm base secured to and configured to pivot relative to the framework between a retracted position and an extended position;
   a force producer secured to the framework and configured generate a force used to pivot the arm base relative to the framework;
   a slip drivetrain configured to connect the force producer to the arm base;
   wherein the framework and the arm base are structurally configured to permit the arm base to pivot past the extended position when subjected to an external force; and
   wherein the slip drivetrain is configured to slip to permit the arm base to pivot past the extended position when subjected to the external force.

15. The apparatus of claim 14, wherein the slip drivetrain comprises a slip clutch.

16. The apparatus of claim 14, further comprising an arm extending from the arm base.

17. The apparatus of claim 16, further comprising a shock absorber disposed between the arm and the arm base and configured to prevent relative movement between the arm and the arm base.

18. The apparatus of claim 14, wherein the framework is configured to permit the arm base to pivot to 180 degrees from the retracted position when subjected to the external force.

19. The apparatus of claim 14, further comprising:
   a position encoder configured to register a rotational position of the arm base relative to the framework; and
   a controller configured to control the force producer; to monitor the rotational position of the arm base; and to recognize when the slip drivetrain has slipped.

20. The apparatus of claim 16, wherein the arm comprises an arm body comprising pultruded fiber.

* * * * *